US012582045B2

(12) United States Patent
Dapper et al.

(10) Patent No.: US 12,582,045 B2
(45) Date of Patent: Mar. 24, 2026

(54) BASECUTTER AUTOMATED HEIGHT CALIBRATION FOR SUGARCANE HARVESTERS

(71) Applicant: AGCO DO BRASIL SOLUÇÕES AGRÍCOLAS LTDA, Ribeireo Preto (BR)

(72) Inventors: Roque Eduardo Dapper, Canoas (BR); Renan Kadiama, Canoas (BR); Gregório Kaminski, Canoas (BR)

(73) Assignee: AGCO DO BRASIL SA LTDA, Ribeireo Preto (BR)

( * ) Notice: Subject to any disclaimer, the term of this patent is extended or adjusted under 35 U.S.C. 154(b) by 527 days.

(21) Appl. No.: 18/004,908

(22) PCT Filed: Jul. 21, 2021

(86) PCT No.: PCT/IB2021/056588
§ 371 (c)(1),
(2) Date: Jan. 10, 2023

(87) PCT Pub. No.: WO2022/018656
PCT Pub. Date: Jan. 27, 2022

(65) Prior Publication Data
US 2023/0354748 A1     Nov. 9, 2023

Related U.S. Application Data

(60) Provisional application No. 63/054,513, filed on Jul. 21, 2020.

(51) Int. Cl.
*A01D 45/10*        (2006.01)
*A01D 41/14*        (2006.01)

(52) U.S. Cl.
CPC .......... *A01D 45/10* (2013.01); *A01D 41/141* (2013.01); *A01D 41/145* (2013.01)

(58) Field of Classification Search
None
See application file for complete search history.

(56) References Cited

U.S. PATENT DOCUMENTS 6,272,819 B1 *   8/2001   Wendte .............. A01D 41/1274
                                                    56/11.9
7,401,455 B1     7/2008   Cleodolphi
                          (Continued)

FOREIGN PATENT DOCUMENTS

AU        2015203052 A1 *  1/2016   .......... A01D 34/664
BR    202013031434 U2 *  1/2016   ............ A01D 45/10
                          (Continued)

OTHER PUBLICATIONS

European Patent Office, International Search Report related to International Patent Application No. PCT/IB2021/056588, mail date Oct. 22, 2021, 15 pages.

*Primary Examiner* — Hitesh Patel
*Assistant Examiner* — Elle Rose Knudson

(57)                ABSTRACT

A sugarcane harvester includes basecutters for cutting sugarcane stalks from sugarcane plants; a chopping section for chopping the sugarcane stalks into billets; a discharge assembly for discharging the billets to a storage vehicle; and a height adjustment system for automatically adjusting a height of the basecutters to avoid unwanted contact between the basecutters and a ground surface.

18 Claims, 4 Drawing Sheets

(56)　　　　　　　References Cited

U.S. PATENT DOCUMENTS

| | | | | |
|---|---|---|---|---|
| 9,961,832 | B2 * | 5/2018 | Scrivner | ................ A01D 45/10 |
| 2015/0362904 | A1 * | 12/2015 | Scrivner | ............. A01D 41/127 |
| | | | | 700/275 |
| 2016/0135365 | A1 * | 5/2016 | Cleodolphi | .......... A01D 41/141 |
| | | | | 56/10.2 E |
| 2019/0037770 | A1 * | 2/2019 | Dugas | .................... A01D 45/10 |
| 2020/0337235 | A1 * | 10/2020 | Blank | ................. A01M 21/043 |

FOREIGN PATENT DOCUMENTS

| | | | | |
|---|---|---|---|---|
| UA | 121312 | C2 * | 5/2020 | ............. G01F 25/14 |
| WO | WO-2015003058 | A2 * | 1/2015 | ............. A01D 45/10 |

* cited by examiner

BASECUTTER AUTOMATED HEIGHT CALIBRATION FOR SUGARCANE HARVESTERS

RELATED APPLICATION

This application is a national stage entry of PCT/IB2021/056588, filled 21 Jul. 2021, and which claims priority benefit with regard to all common subject matter of earlier-filed U.S. Provisional Patent Application Ser. No. 63/054,513, filed on Jul. 21, 2020, and entitled "BASECUTTER AUTOMATED HEIGHT CALIBRATION FOR SUGARCANE HARVESTERS", which is hereby incorporated by reference in its entirety into the present application.

BACKGROUND

Sugarcane harvesters are large moveable agricultural machines that harvest and partially process sugarcane. A typical sugarcane harvester cuts sugarcane stalks from sugarcane plants as it moves through the plants, strips leaves from the sugarcane stalks, cuts the sugarcane stalks into billets, and ejects the leaves, stems, and other waste material back onto the sugarcane field where they act as fertilizers.

A conventional sugarcane harvester includes basecutters with rotating blades that sever sugarcane stalks from sugarcane plants. The basecutters are ideally positioned close to the ground so as to capture as much of the sugarcane stalks as possible, but they should not be positioned too low or they will contact the ground when the harvester is driven over uneven surfaces. Cutting too close to the ground can also damage the plants and harm plant regrowth and production. Other variables such as crop density and harvester speed may also affect the ideal basecutter height.

Operators typically select and adjust the basecutter height before starting a harvesting operation, but it is difficult and time-consuming to change the height after harvesting has begun, so many operators select an unnecessarily high height to avoid unwanted ground contact. As explained above, this leaves harvestable portions of the plants in the field and thus reduces crop yield. Some harvesters automatically lift their basecutters when ground contact is detected but lack effective procedures to return the basecutters to their target height.

SUMMARY

The present invention solves at least some of the above-described problems and related problems and provides a distinct advance in the art of sugarcane harvesters. More particularly, the present invention provides a sugarcane harvester that automatically adjusts the height of its basecutters to achieve maximum cutting capabilities while avoiding unwanted ground contact.

A sugarcane harvester constructed in accordance with an embodiment of the invention broadly comprises an intake and cutting assembly; a chopping section; a discharge assembly; and an automatic height adjustment system that automatically adjusts the height of basecutters of the intake and cutting assembly.

The intake and cutting assembly cuts sugarcane stalks from sugarcane plants as the sugarcane harvester moves through the plants. The intake and cutting assembly may include a topper to cut off the leafy top portions of the sugarcane plants, one or more crop divider scrolls to divide and separate the sugarcane plants, one or more knockdown rollers to knock down the sugarcane plants, the above-described basecutters, and a feed section to feed the sugarcane stalks rearwardly to the chopping section. In one embodiment, the basecutters include rotary blades operated by at least one hydraulic motor.

The chopping section receives the sugarcane stalks from the intake and cutting assembly and chops or otherwise cuts the sugarcane stalks into billets. In one embodiment, the chopping section includes blades or other chopping mechanisms operated by at least one hydraulic motor.

The discharge assembly is positioned at or near the rear of the harvester and receives the sugarcane billets from the chopping section and then discharges the billets into a wagon or other storage vehicle that travels alongside the harvester. The discharge assembly may comprise elevators, conveyors, or the like that lift the billets to an elevated position and discharge the billets to a wagon or other storage vehicle or mechanism following the harvester. In one embodiment, the discharge assembly includes at least one hydraulic motor for driving the elevators, conveyors, or the like.

The harvester may also include one or more extractor fans or blowers that separate leaves, stems, and other crop residue from the billets and discharges the debris back into the sugarcane field.

In accordance with an important aspect of the invention, the height adjustment system automatically adjusts the height of the basecutters to achieve maximum cutting capabilities while avoiding unwanted ground contact. An embodiment of the height adjustment system includes a height adjustment mechanism for raising or lowering the basecutters; one or more sensors that monitor operational aspects of the basecutters and/or other components of the harvester; and a processing system that receives signals from the sensors and automatically controls the height adjustment mechanism to adjust the height of the basecutters to achieve maximum cutting capabilities while avoiding unwanted ground contact.

In one embodiment, the sensors include a pressure sensor that monitors the hydraulic pressure associated with the basecutter motor. This monitored pressure is representative of the load on the basecutter motor. If the basecutters touch the ground, the load increases, and the pressure sensor readings spike. The processing system monitors this and directs the height adjustment mechanism to raise the basecutters until the pressure readings drop. In one embodiment, the processing system raises the basecutters if the pressure sensor reading exceeds a threshold level. In other embodiments, the processing system raises the basecutters if the pressure sensor reading increases at a rate that exceeds a threshold rate.

The height adjustment system may also include other sensors that directly or indirectly monitor loads of the harvester so as to calibrate the basecutter height adjustment. In one embodiment, the sensors may include a pressure sensor that monitors the hydraulic pressure associated with the hydraulic motor that drives the chopping section. A higher chopper motor pressure indicates a higher yield of sugarcane stalks entering the chopping section, which explains a corresponding increase in the basecutter motor pressure. Likewise, a lower chopper motor pressure indicates a lower yield of sugarcane stalks entering the chopping section, which explains a corresponding decrease in the basecutter motor pressure. The processing system may consider pressure readings of both the basecutter motor pressure sensor and the chopper motor pressure sensor to determine whether the basecutters are contacting the ground. For example, if the basecutter motor pressure and the chopper motor pressure rise together by a proportional amount, this may indicate increased crop yield rather than the basecutters contacting the ground. However, if the basecutter motor pressure rises but the chopper motor pressure does not, this may indicate the basecutters are contacting the ground.

In another embodiment, the sensors may include a speed sensor that monitors the ground speed of the harvester. A higher speed may indicate a higher yield of sugarcane stalks entering the harvester, which explains a corresponding increase in the basecutter motor pressure. Likewise, a lower ground speed indicates a lower yield of sugarcane stalks entering the harvester, which explains a corresponding decrease in the basecutter motor pressure. If the basecutter motor pressure and the harvester speed rise together by a proportional amount, this may indicate increased crop yield rather than the basecutters contacting the ground. However, if the basecutter motor pressure rises but the harvester speed does not, this may indicate the basecutters are contacting the ground.

In yet another embodiment, the sensors may include a pressure sensor that monitors the hydraulic pressure associated with the motor that drives transport rollers of the discharge assembly. A higher pressure indicates a higher yield of sugarcane billets being transported, which explains a corresponding increase in the basecutter motor pressure. Likewise, a lower pressure indicates a lower yield of sugarcane billets being transported, which explains a corresponding decrease in the basecutter motor pressure. If the basecutter motor pressure and the discharge motor pressure rise together by a proportional amount, this may indicate increased crop yield rather than the basecutters contacting the ground. However, if the basecutter pressure rises but the discharge motor pressure does not, this may indicate the basecutters are contacting the ground.

In accordance with another important aspect of the invention, the height adjustment system is programmed to return the basecutters to a target height after they are raised or lowered pursuant to an algorithm that considers both monitored pressures and inferred pressures. A target height of the basecutters is associated with a setpoint pressure of the basecutter motor. For example, a target basecutter height of 5 cm may be associated with a particular setpoint pressure. The processing system monitors actual pressure readings of motors of the harvester as the harvester operates and as the basecutters are raised and/or lowered; calculates an expected or inferred pressure of the basecutter motor that would be expected if the harvester's basecutters were at the target height; and after a selected time period, sets the inferred pressure as the setpoint pressure so that the basecutters are automatically and incrementally moved back to their target height.

More specifically, the above-described hydraulic pressure sensors monitor the actual pressures on the basecutter motor, the chopper motor, and the discharge motor. The processing system receives these pressure readings and calculates average pressures and standard deviations of these monitored pressures over a rolling window time period. When the basecutters are raised or lowered, the processing system calculates an inferred pressure of the basecutter motor if the basecutters were at their target height. This inferred pressure is calculated with an algorithm programmed into the processing system that takes into account the monitored pressures. Over a rolling time window, averages and standard deviations of the inferred pressure are calculated. At the conclusion of the time window, the inferred pressure is used as the setpoint for the basecutter motor. For example, if the setpoint pressure for the basecutter motor at a target height of 5 cm is initially X psi, but the measured pressure of the basecutter motor increases to X+ psi because of higher crop density, the basecutter motor will lift the basecutters until the measured pressure drops back to X psi. The processing system monitors the actual pressures of the motors as the harvester operates at the higher basecutter height, calculates averages and standard deviations of these pressures, calculates the inferred pressure of the basecutter motor if it were at the target height and calculates averages and standard deviations of the inferred pressure. At the conclusion of the time window, the processing system changes the setpoint pressure of the basecutter motor to the last calculated inferred pressure so that the basecutters are moved back to their target height.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
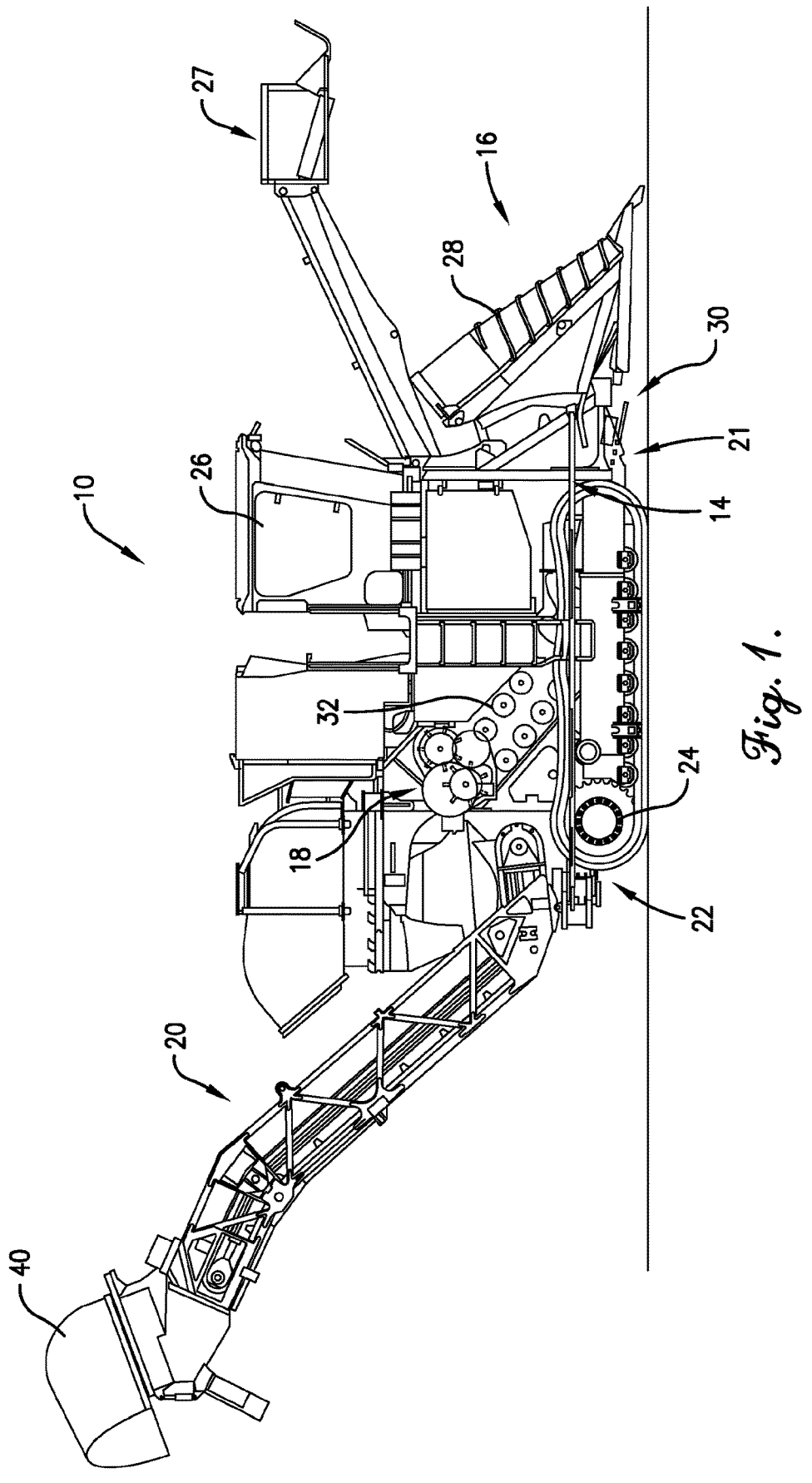
FIG. 1 is side elevational view of a sugarcane harvester constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

Turning now to the drawing figures, a sugarcane harvester 10 constructed in accordance with embodiments of the invention is illustrated. As explained in more detail below, the sugarcane harvester 10 automatically adjusts the height of its basecutters to achieve maximum cutting capabilities while avoiding unwanted ground contact.

An embodiment of the sugarcane harvester broadly comprises a movable chassis 14; an intake and cutting assembly 16; a chopping section 18; and a discharge assembly 20. Other embodiments of the sugarcane harvester 10 may have additional and/or different components.

The chassis 14 has a forward end 21 and a rearward end 22 disposed along a longitudinal axis that is essentially parallel to a ground surface over which the harvester travels. The chassis 14 rides on wheels, belts, or other ground-engaging traction elements 24 that are driven by conventional motors, transmissions, and associated mechanical and electrical components. An operator's station 26 may be supported on top the chassis, although the harvester may also include various sensors and controls that provide autonomous operation without direct operator control.

The intake and cutting assembly 16 is supported on the forward end 21 of the chassis 14 for cutting sugarcane stalks from sugarcane plants as the sugarcane harvester moves through the plants. The intake and cutting assembly 16 may include a topper 27 to cut off the leafy top portions of the sugarcane plants, one or more crop divider scrolls 28 to divide and separate the sugarcane plants, one or more knockdown rollers to knock down the sugarcane plants, one or more base cutter assemblies 30 to sever sugarcane stalks from the sugarcane plants, and a feed section 32 to feed the sugarcane stalks rearwardly to the chopping section 18.

The base cutter assemblies 30 include rotary blades or other cutting implements and at least one hydraulic motor 32 (FIG. 2) or other drive mechanism for rotating the blades. The basecutters 30 can be adjusted up or down by height adjustment mechanism 34 (FIG. 2) so the blades are any distance above the ground as described in more detail below. The height adjustment mechanism 34 may include hydraulic motors, cylinders, or other mechanisms for raising or lowering the basecutters 30. The mechanism 34 may also include or be coupled with hydraulic valves, relays, actuators, or other control mechanisms that can be controlled by the processing system 46 described below.

The chopping section 18 is supported between the forward and rearward ends of the chassis 14 and receives the sugarcane stalks from the intake and cutting assembly 16 and chops or otherwise cuts the sugarcane stalks into billets. In one embodiment, the chopping section includes chopping blades and a hydraulic motor 36 (FIG. 2) for driving the chopping blades.

In some embodiments, the sugarcane harvester 10 also comprises an internal bin or other storage mechanism supported on the chassis 14 between the chopping section 18 and the discharge assembly 12 for storing a quantity of the billets before they are discharged from the harvester.

The discharge assembly 20 is positioned at or near the rear of the harvester and receives the sugarcane billets from the chopping section 18 and discharges the billets into a wagon or other storage vehicle that travels alongside the harvester. The discharge assembly may comprise elevators, conveyors, and the like that receive the billets from the chopping section 18, elevate the billets, and discharge them from the harvester. In one embodiment, the discharge assembly comprises at least one hydraulic transport motor 38 (FIG. 2) for driving transport rollers, elevators, or conveyors of the discharge assembly.

The discharge assembly 20 may also comprise one or more extractor fans 40 or blowers that direct pressurized air over the billets to separate leaves, stems, and other crop residue from the billets and discharge the debris back into the sugarcane field.

Figure 2:
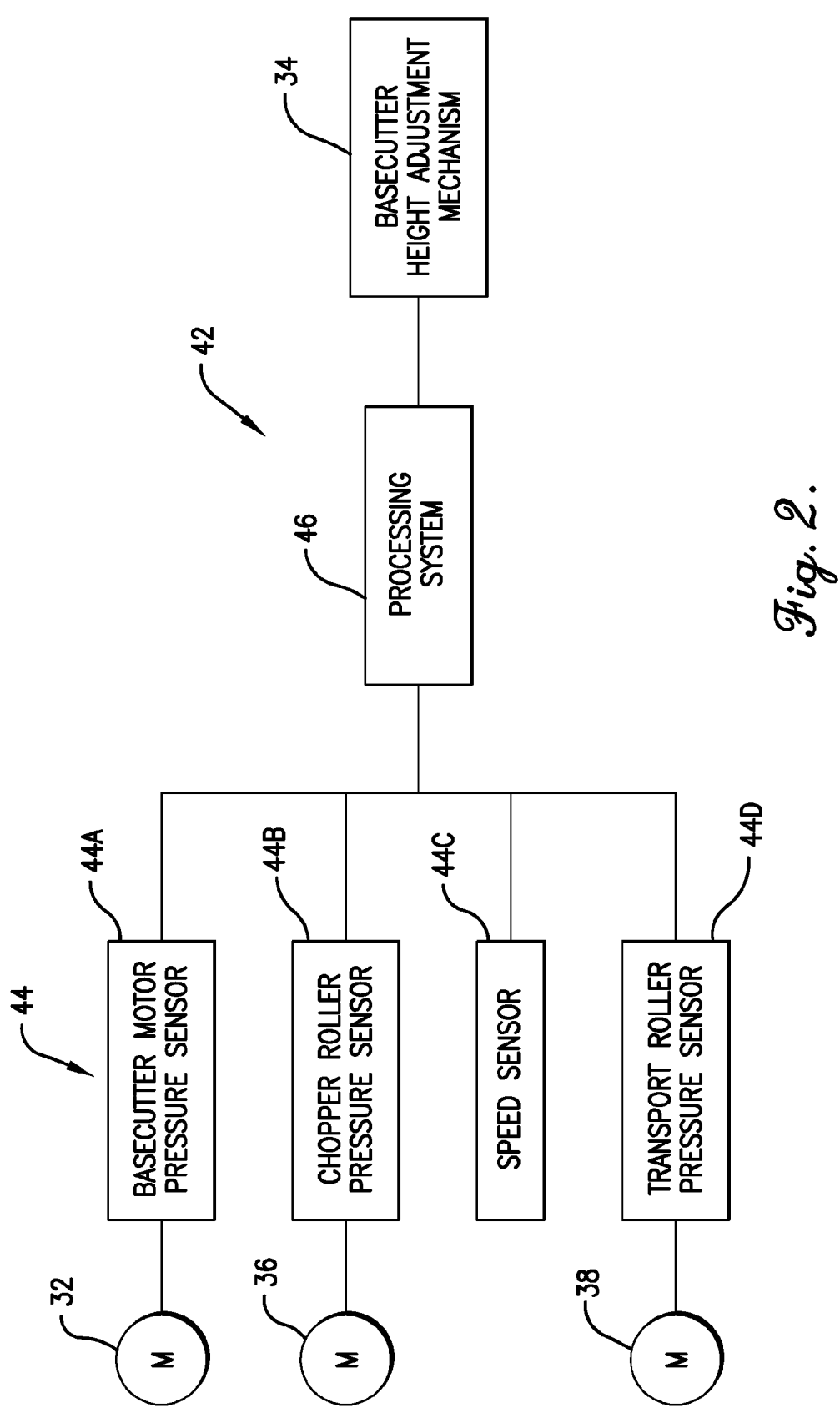
FIG. 2 is a block diagram of an exemplary height adjustment system for the sugarcane harvester.

In accordance with an important aspect of the invention, the sugarcane harvester also comprises a height adjustment system 42 that automatically adjusts the height of the basecutters 30 to achieve maximum cutting capabilities while avoiding unwanted ground contact. The height adjustment system 42 may be incorporated in a control system of the harvester or may be a stand-alone system. An embodiment of the height adjustment system 42 is depicted in FIG. 2 and broadly includes the height adjustment mechanism 34 described above; one or more sensors 44; and a processing system 46.

The height adjustment mechanism 34 may include hydraulic motors, cylinders, or other mechanisms for raising or lowering the basecutters 30. The mechanism 34 may also include or be coupled with hydraulic valves, relays, actuators, or other control mechanisms that can be controlled by the processing system 46 described below.

The sensors 44 may monitor any operational aspects of the basecutters 30 or other driven components of the harvester that are directly or indirectly proportional to a load on the basecutters. In one embodiment, the sensors 44 include a pressure sensor 44A that monitors the hydraulic pressure associated with the basecutter motor 32. In another embodiment, the sensors 44 may include a pressure sensor 44B that monitors the hydraulic pressure associated with the chopper motor 36. In another embodiment, the sensors 44 may include a speed sensor 44C that monitors the ground speed of the harvester. In yet another embodiment, the sensors 44 may include a pressure sensor 44D that monitors the hydraulic pressure associated with transport rollers or other components driven by the discharge assembly motor 38. These are just examples of sensors that may be used to implement the functional aspects of the invention described herein and may be replaced with or supplemented with any other sensors that directly or indirectly monitor loads on the basecutters.

The processing system 46 receives signals from the sensors 44 and automatically controls the height adjustment mechanism 34 to adjust the height of the basecutters 30 to achieve maximum cutting capabilities while avoiding unwanted ground contact. The processing system 46 may be any type of circuitry or other computing elements that are operable to receive signals from the sensors 44 and provide control and/or power signals to the height adjustment mechanism 34. The processing elements may be coupled with suitable relays, switches, and/or valves and may be programmed with logic or a number of routines, subroutines, applications, or instructions for performing the instructions described herein. The processing system 46 may also include or be coupled with communication elements for sending data to remote control devices and for receiving instructions from the remote devices.

In one embodiment, the processing system 46 receives signals from the pressure sensor 44A to monitor the load on the basecutter motor 32. If the basecutters 30 touch the ground, the pressure sensor readings spike and the processing system 46 directs the height adjustment mechanism 34 to raise the basecutters until the pressure readings drop. In one embodiment, the processing system 46 raises the basecutters 30 if the pressure sensor 44A reading exceeds a threshold pressure level. The threshold level may be fixed or variable and may be any value greater than an average motor pressure experienced while operating the harvester with no contact between the basecutter and the ground. More specific threshold levels are described below. In other embodiments, the processing system 46 raises the basecutters 30 if the pressure sensor reading increases at a rate that exceeds a threshold rate.

In other embodiments, the processing system 46 also receives signals from the pressure sensor 44B that monitors the hydraulic pressure associated with the chopper motor 36. A higher chopper motor pressure indicates a higher yield of sugarcane stalks entering the chopping section, which explains a corresponding increase in the basecutter motor pressure. Likewise, a lower chopper motor pressure indicates a lower yield of sugarcane stalks entering the chopping section, which explains a corresponding decrease in the basecutter motor pressure. The processing system 46 may consider pressure readings of both the basecutter motor pressure sensor 44A and the chopper motor pressure sensor 44B to determine whether the basecutter is contacting the ground. For example, if the basecutter pressure and the chopper motor pressure rise together by a proportional amount, this may indicate increased crop yield rather than the basecutter contacting the ground. In this case, the processing system may maintain the current height of the basecutters. However, if the basecutter pressure rises but the chopper motor pressure does not, this may indicate the basecutter is contacting the ground. This triggers the processing system to increase the current height of the basecutters.

In another embodiment, the processing system 46 also receives signals from the ground speed sensor 44C. A higher speed may indicate a higher yield of sugarcane stalks entering the harvester, which explains a corresponding increase in the basecutter motor pressure. Likewise, a lower ground speed indicates a lower yield of sugarcane stalks entering the harvester, which explains a corresponding decrease in the basecutter motor pressure. The processing system may consider signals from both the basecutter motor pressure sensor 44A and the speed sensor 44C to determine whether the basecutter is contacting the ground. For example, if the basecutter pressure and the harvester speed rise together by a proportional amount, this may indicate increased crop yield rather than the basecutter contacting the ground. In this case, the processing system may maintain the current height of the basecutters. However, if the basecutter pressure rises but the harvester speed does not, this may indicate the basecutter is contacting the ground. This triggers the processing system to increase the current height of the basecutters.

In yet another embodiment, the processing system 46 also receives signals from the pressure sensor 44D that monitors the hydraulic pressure associated with the motor 38 for the discharge conveyors. A higher pressure indicates a higher yield of sugarcane billets being transported, which explains a corresponding increase in the basecutter motor pressure. Likewise, a lower pressure indicates a lower yield of sugarcane billets being transported, which explains a corresponding decrease in the basecutter motor pressure. If the basecutter pressure and the discharge motor pressure rise together by a proportional amount, this may indicate increased crop yield rather than the basecutter contacting the ground. In this case, the processing system may maintain the current height of the basecutters. However, if the basecutter pressure rises but the discharge motor pressure does not, this may indicate the basecutter is contacting the ground. This triggers the processing system to increase the current height of the basecutters.

The hydraulic pressure readings of the above-described sensors 44 and/or possibly other sensors are thus used to adjust the height of the basecutters via the processing system 46 and the height adjustment mechanism 34. A pressure reading of the basecutter motors above a predetermined threshold amount, or a rapidly increasing pressure reading, may indicate that the basecutter is in contact with the ground, and the processing system responds by increasing the height of the basecutters. A pressure reading below a predetermined threshold amount may indicate that the basecutter is cutting too high on sugarcane stalks, and the processing system responds by decreasing the height of the basecutter.

In accordance with another important aspect of the invention, the processing system of the height adjustment system is programmed to incrementally return the basecutters to a target height after they are raised or lowered pursuant to an algorithm that considers both monitored pressures and inferred pressures. A target height of the basecutters is associated with a setpoint pressure of the basecutter motor. For example, a target basecutter height of 5 cm may be associated with a particular setpoint pressure. The processing system monitors actual pressure readings of motors of the harvester as the harvester operates and as the basecutters are raised and/or lowered; calculates an expected or inferred pressure of the basecutter motor that would be expected if the harvester's basecutters were at the target height; and after a selected time period, sets the inferred pressure as the setpoint pressure so that the basecutters are automatically and incrementally moved back to their target height.

More specifically, the above-described hydraulic pressure sensors monitor the actual pressures on the basecutter motor, the chopper motor, and the discharge motor. The processing system receives these pressure readings and calculates average pressures and standard deviations of these monitored pressures over a rolling window time period. When the basecutters are raised or lowered, the processing system calculates an inferred pressure of the basecutter motor if the basecutters were at their target height. This inferred pressure is calculated with an algorithm programmed into the processing system that takes into account the monitored pressures. Over a rolling time window, averages and standard deviations of the inferred pressure are calculated. At the conclusion of the time window, the inferred pressure is used as the setpoint for the basecutter motor. For example, if the setpoint pressure for the basecutter motor at a target height of 5 cm is initially X psi, but the measured pressure of the basecutter motor increases to X+ psi because of higher crop density, the basecutter motor lifts the basecutters until the measured pressure drops back to X psi. The processing system monitors the actual pressures of the motors as the harvester operates at the higher basecutter height, calculates averages and standard deviations of these pressures, calculates the inferred pressure of the basecutter motor if it were at the target height and calculates averages and standard deviations of the inferred pressure. At the conclusion of the time window, the processing system changes the setpoint pressure of the basecutter motor to the last calculated inferred pressure so that the basecutters are moved back to their target height.

Figure 4:
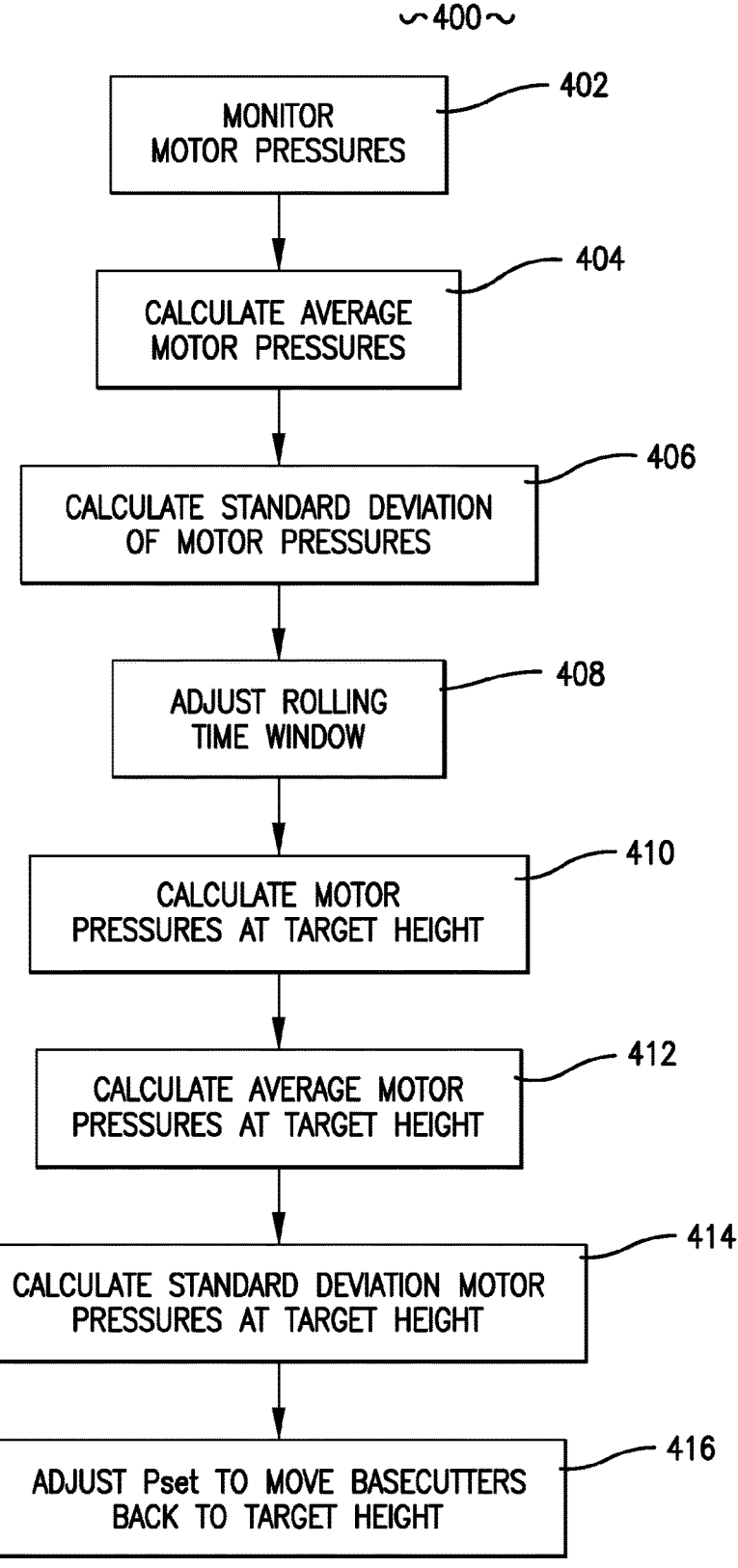
FIG. 4 is a flow diagram that depicts steps in a method of the present invention and/or functions performed by a processing system and/or control system of the present invention.

More specific embodiments of the above-described measurements and calculations will now be described with reference to FIG. 4, which depicts exemplary steps in a method 400 of the present invention and/or functions performed by the control system of the invention. The illustrated steps may be performed in any order and/or supplemented or replaced with other steps. Some of the steps may be implemented with the processing system 46 or another computing device.

As shown in step 402, the processing system continuously or periodically monitors actual pressure readings received from the sensors 44 for the basecutter motor 32, the chopper motor 36, and the transport motor 38 as the harvester operates and as the basecutters are raised and/or lowered for any of reasons discussed above.

As shown in steps 404 and 406, the processing system then calculates averages and standard deviations of the monitored pressures. The averages and standard deviations are calculated and updated during a rolling time window.

The control system 42 may include a user interface that permits an operator to select or adjust the duration of the rolling time window as shown in step 408. The length of the rolling time window determines how quickly the system adapts to changing field conditions. A relatively shorter rolling time window increases the sensitivity such the control system adapts more quickly, and a relatively longer rolling time window decreases the sensitivity such the control system adapts more slowly. In one embodiment, the rolling time window may be adjustable between 30 seconds and 10 minutes.

The processing system next calculates the expected or inferred pressure of the basecutter motor 32 that would be expected if the harvester's basecutters were at their target height as shown in step 410. This inferred pressure is subsequently used to slowly move the basecutters back to their target height after the basecutters are raised or lowered as described in more detail below. Averages and standard deviations of the inferred pressure readings are then calculated over the same rolling time window mentioned above as shown in steps 412, 414.

In one embodiment, the inferred pressure is calculated with the following formula:

$$PAdj=(((H-Hset)/Hset))*Pstd*K)+P$$

Where: PAdj is the inferred basecutter motor 32 pressure at the target height; H is the current height of the basecutters, Hset is the target height of the basecutters, Pstd is the standard deviation of the monitored pressures, K is a gain setting, and P is the current monitored pressure of the basecutter motor 32.

During the rolling time window, the average values and standard deviations of P will converge toward the calculated PAdj so that PAdj becomes more representative of the current actual conditions of the sugarcane crop and/or the field. At the conclusion of the rolling time window, the processor sets the most recent calculated pressure PAdj to be the setpoint pressure for the basecutters at the target height of 5 cm (or any other target height) so that the processing system moves the basecutters back toward the target height as depicted in step 416.

Figure 3:
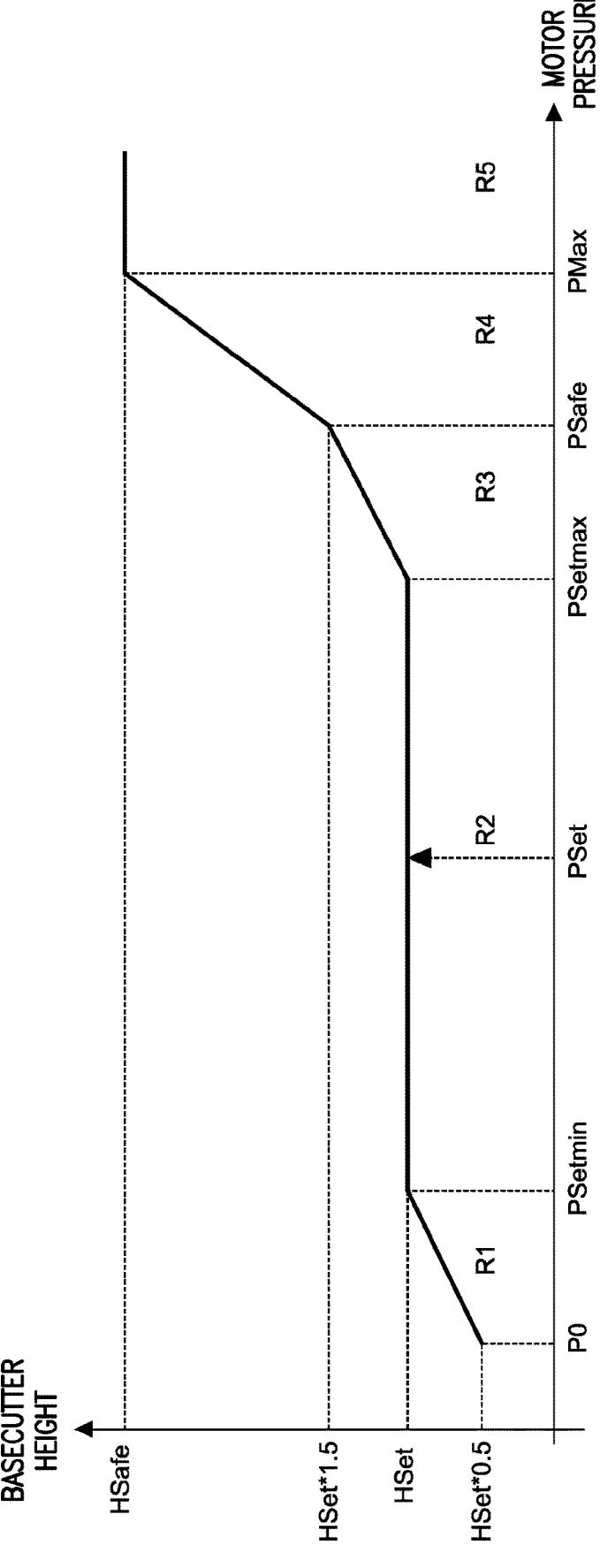
FIG. 3 is a graph that depicts exemplary operations of the height adjustment system.

The graph in FIG. 3 illustrates examples of how the height adjustment system 42 may respond to different measured pressure readings by adjusting the basecutter height. In this graph, the following pressure levels are illustrated:

Pressure Point P0: This pressure level is acquired and defined during calibration. In this example, this is the pressure of the basecutter hydraulic motor 32 without load at 60° C.

Pressure Point PSet: This is the average pressure of the base cutter motor 32 experienced while harvesting at the target basecutter height HSet over the time window. This is also known as the setpoint pressure for the basecutter motor 32.

Pressure Point PSetMin: This is the minimum pressure of the base cutter motor 32 in the region that the harvester maintains a basecutter cutting height. In one embodiment, it is defined as PSetMin=Pset−1.28*StdDev(Pset). In other words, this pressure is defined as the average pressure minus 1.28 times the standard deviation of the pressure during harvesting.

Pressure Point PSetMax: This is the maximum pressure in the region that the harvester maintains a cutting height. It is defined as PSetMin=Pset+1.28*StdDev(Pset). In other words, this pressure is defined as the average pressure plus 1.28 times the standard deviation of the pressure during harvesting.

Pressure Point PSafe: This is the maximum pressure safe for harvesting. Above this pressure, it is likely that the basecutter knives are touching the ground. In one embodiment, this pressure point is defined as PSafe=min(Pset+ 2.56*StdDev(Pset), max 4000 psi). In other words, this pressure is defined as the average pressure plus 2.56 times the standard deviation of the pressure during the harvesting, with a maximum of 4000 psi.

Pressure Point PMax: This is the maximum pressure that the basecutters can tolerate. Above this pressure, the basecutter motors and other components may be damaged. In one embodiment, this pressure is 4000 psi.

Now returning to the graph of FIG. 3:

Region R1:

This region is defined by a line running from point P0, Hset/2 to point PSetmin, HSet.

The default action of the height adjustment system 42 in this region is to decrease proportionally the basecutter height between Hset and Hset/2, as a function of the average base cutter pressure.

Reasons the basecutter pressure may be in this region include:

(1) The basecutter distance to the ground is higher than the original location where the harvester was calibrated.

(2) The productivity (yield) of the area is lower than the original location where the harvester was calibrated.

(3) The harvester is in an area with crop failure or is crossing a non-crop area such as a road.

To distinguish between the different reasons why the system may be in region 1, the processing system 46 may consider the hydraulic pressure associated with the chopper motor 36. If this pressure remains close to an average calibrated pressure, the processing system 46 determines the harvester is not in an area with crop failure or crossing a non-crop area such as a road, so the processing system keeps the base cutter at HSet.

Region R2:

This region is described by a flat line running from point PSetmin, Hset to point PSetmax, HSet.

In this region, it is assumed the harvester is cutting at an adequate height.

If the pressure varies between PSetmin and PSetmax, the processing system maintains the base cutter at its calibrated or target height.

Region R3:

This region is described by a line running from point PSetmax, Hset to point PSafe, HSet*1.5.

The default behavior when the harvester is operating in this region is to increase proportionally the basecutter height between Hset and Hset*1.5, as a function of the average basecutter motor pressure.

There are three primary reasons why the harvester may operate in this region:

The height of the basecutter above the ground is lower than the original height when the machine was calibrated.

The productivity (yield) of the area is greater than that of the original location were the machine was calibrated.

The base cutter is touching the ground.

To distinguish among the different reasons why the harvester may be in this region, the processing system 46 may consider the hydraulic pressure associated with the chopper motor 36. If that pressure remains close to an average calibrated pressure, the processing system determines the harvester is passing through an area of increased productivity (yield) and keeps the basecutter in HSet.

Region R4:

This region is described by a line running from point PSafe, HSet*1.5 to point PMax, HSafe.

The default harvester behavior in this region is to increase proportionally the basecutter height between Hset*1.5 and HSafe, as a function of the average base cutter motor pressure.

There are three primary reasons why the harvester may operate in this region:

The height of the basecutter above the ground is much lower than the original height when the machine was calibrated.

The productivity (yield) of the area is much greater than that of the original location were the machine was calibrated.

The basecutter is in contact with the ground (this is the most likely reason) Region R5:

This region is described by a constant line starting at point PMax, HSafe.

If the system is operating within this region, it is very likely that the basecutter is experiencing a severe ground contact event. If the basecutter pressure remains over PMax for more than a selected time such as 3 seconds, the processing system disables automatic height control and sounds an alarm.

Thus, the hydraulic pressure associated with the basecutter drive motor 32 is used to estimate a height (or change in height) of the basecutter from the ground surface. The basecutter motor pressure from sensor 44A is supplemented by other data collected from the sensors 44B, 44C, and 44D. Data from all the sensors may be merged/fused to get a more detailed picture of the harvester's operating environment to determine whether variations in the basecutter pressure are due to changes in the basecutter height or other operational factors.

In some embodiments, one or more of the supplemental data sensors 44B, 44C, 44D are used to shift the graph in FIG. 3. For example, an increase in the chopper motor pressure indicates an increase in yield and a corresponding increase in the cutter knife pressure. The processing system 46 may respond by shifting the regions R1 through R5 to the right to compensate for the change. Similarly, an increase in the machine's ground speed results in an increase in the basecutter pressure. The processing system 46 may respond by shifting the regions R1 through R5 to the right to compensate for the change.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing system, element, or the like may be implemented as special purpose or as general purpose. For example, the processing system 46 may comprise dedicated circuitry or logic that is permanently configured, such as an application-specific integrated circuit (ASIC), or indefinitely configured, such as an FPGA, to perform certain operations. The processing system may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing system" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A sugarcane harvester for harvesting sugarcane stalks from sugarcane plants, the sugarcane harvester comprising:
   an intake and cutting assembly for cutting the sugarcane stalks from the sugarcane plants as the sugarcane harvester moves through the sugarcane plants, the intake and cutting assembly including basecutters for cutting bases of the sugarcane plants, wherein the basecutters include a rotary blade and a hydraulic motor for rotating the blade;
   a chopping section for receiving the sugarcane stalks from the intake and cutting assembly and chopping the sugarcane stalks into billets;
   a discharge assembly for receiving the billets from the chopping section and discharging the billets to a wagon or other storage vehicle or mechanism; and
   a height adjustment system for automatically adjusting a height of the basecutters to avoid unwanted contact between the basecutters and a ground surface, the height adjustment system comprising a pressure sensor for monitoring an actual hydraulic pressure associated with the hydraulic motor of the basecutters and a processing system that calculates an expected pressure of the hydraulic motor of the basecutters that would be expected if the basecutters were at a target height and adjusts the height of the basecutters as a function of the actual hydraulic pressure and the expected pressure,
   wherein the chopping section includes a chopping blade and a hydraulic motor for driving the chopping blade,
   wherein the height adjustment system comprises a chopping motor sensor for monitoring a hydraulic pressure associated with the hydraulic motor of the chopping blade, and
   wherein the processing system adjusts the height of the basecutters as a function of the pressure associated with the hydraulic motor of the chopping blade and the pressure associated with the hydraulic motor of the basecutters.

2. The sugarcane harvester as set forth in claim 1, wherein the height adjustment system comprises a height adjustment mechanism for raising or lowering the basecutters.

3. The sugarcane harvester as set forth in claim 2, wherein the height adjustment mechanism comprises a hydraulic motor or cylinder for raising or lowering the basecutters.

4. The sugarcane harvester as set forth in claim 1, wherein the target height is between 3-8 cm above the ground surface.

5. The sugarcane harvester as set forth in claim 4, wherein the processing system calculates the expected pressure with an algorithm that evaluates averages and standard deviations of the actual hydraulic pressure.

6. The sugarcane harvester as set forth in claim 1, further comprising a speed sensor for sensing a ground speed of the harvester.

7. The sugarcane harvester as set forth in claim 1, wherein the discharge assembly includes a hydraulic motor, wherein the height adjustment system comprises a discharge motor sensor for monitoring a hydraulic pressure associated with the hydraulic motor of the discharge assembly.

8. The sugarcane harvester as set forth in claim 7, wherein the processing system receives signals from the chopping motor sensor and the discharge motor sensor and evaluates the signals for automatically adjusting the height of the basecutters in response to the signals.

9. The sugarcane harvester as set forth in claim 1, further comprising a movable chassis on which the intake and cutting assembly, the chopping section, and an elevator and conveyor assembly are mounted.

10. A sugarcane harvester for harvesting sugarcane stalks from sugarcane plants, the sugarcane harvester comprising:

a movable chassis having a forward end and a rearward end disposed along a longitudinal axis;

an intake and cutting assembly mounted on the forward end of the chassis for cutting the sugarcane stalks from the sugarcane plants as the sugarcane harvester moves through the sugarcane plants, the intake and cutting assembly including basecutters for cutting bases of the sugarcane plants, wherein the basecutters include a rotary blade and a hydraulic motor for rotating the blade;

a chopping section mounted between the forward end and rearward end of the chassis for receiving the sugarcane stalks from the intake and cutting assembly and chopping the sugarcane stalks into billets;

a discharge assembly for receiving the billets from the chopping section and discharging the billets to a wagon or other storage vehicle or mechanism; and a height adjustment system for automatically adjusting a height of the basecutters to avoid unwanted contact between the basecutters and a ground surface, the height adjustment system comprising:

a height adjustment mechanism for raising or lowering the basecutters;

a hydraulic pressure sensor for monitoring a current hydraulic pressure associated with the hydraulic motor of the basecutters and generating corresponding sensor signals; and a processing system for receiving the sensor signals from the hydraulic pressure sensor and controlling the height adjustment mechanism in response to the sensor signals, wherein the processing system calculates an expected pressure of the hydraulic motor of the basecutters that would be expected if the basecutters were at a target height, wherein the chopping section includes a chopping blade and a hydraulic motor for driving the chopping blade, wherein the height adjustment system comprises a chopping motor sensor for monitoring a hydraulic pressure associated with the hydraulic motor of the chopping blade and generating corresponding sensor signals, and wherein the processing system receives and analyzes the sensor signals from the chopping motor sensor and adjusts the height of the basecutters as a function of the pressure associated with the hydraulic motor of the chopping blade and the pressure associated with the hydraulic motor of the basecutters.

11. The sugarcane harvester as set forth in claim 10, wherein the target height is between 3-8 cm.

12. The sugarcane harvester as set forth in claim 11, wherein the processing system compares the current hydraulic pressure to a threshold pressure value and triggers the height adjustment mechanism to raise the height of the basecutter if the current hydraulic pressure exceeds the threshold pressure value.

13. The sugarcane harvester as set forth in claim 10, wherein the processing system receives and analyzes the sensor signals from the chopping motor sensor to calibrate control of the height adjustment mechanism.

14. The sugarcane harvester as set forth in claim 12, further comprising a speed sensor for sensing a ground speed of the harvester and generating corresponding sensor signals.

15. The sugarcane harvester as set forth in claim 14, wherein the processing system receives and analyzes the sensor signals from the speed sensor to calibrate control of the height adjustment mechanism.

16. The sugarcane harvester as set forth in claim 12, wherein the discharge assembly includes a hydraulic motor, wherein the height adjustment system comprises a discharge motor sensor for monitoring a hydraulic pressure associated with the hydraulic motor of the discharge assembly.

17. The sugarcane harvester as set forth in claim 16, wherein the processing system receives and analyzes the sensor signals from the discharge motor to calibrate control of the height adjustment mechanism.

18. The sugarcane harvester as set forth in claim 10, wherein the height adjustment mechanism comprises a hydraulic motor or cylinder for raising or lowering the basecutters.

\* \* \* \* \*